(12) United States Patent
Schulman et al.

(10) Patent No.: US 8,948,993 B2
(45) Date of Patent: Feb. 3, 2015

(54) METHOD AND SYSTEM FOR CONTROLLING THE BEHAVIOR OF AN OCCUPANT OF A VEHICLE

(71) Applicants: Richard Schulman, Kalamazoo, MI (US); Ronald Van Houten, Kalamazoo, MI (US)

(72) Inventors: Richard Schulman, Kalamazoo, MI (US); Ronald Van Houten, Kalamazoo, MI (US)

( * ) Notice: Subject to any disclaimer, the term of this patent is extended or adjusted under 35 U.S.C. 154(b) by 0 days.

(21) Appl. No.: 14/200,112

(22) Filed: Mar. 7, 2014

(65) Prior Publication Data

US 2014/0257661 A1    Sep. 11, 2014

Related U.S. Application Data

(60) Provisional application No. 61/774,894, filed on Mar. 8, 2013.

(51) Int. Cl.
| | |
|---|---|
| *B60R 22/00* | (2006.01) |
| *E05F 15/00* | (2006.01) |
| *G05D 1/00* | (2006.01) |
| *G05D 3/00* | (2006.01) |
| *G06F 7/00* | (2006.01) |
| *G06F 7/70* | (2006.01) |
| *G06F 19/00* | (2011.01) |
| *G06G 7/00* | (2006.01) |
| *G06G 7/76* | (2006.01) |
| *B60W 50/00* | (2006.01) |
| *B60W 50/08* | (2012.01) |

(52) U.S. Cl.
CPC .......... *B60W 50/0098* (2013.01); *B60W 50/08* (2013.01); *B60W 2050/0002* (2013.01)
USPC .................... 701/70; 701/36; 701/45; 701/48

(58) Field of Classification Search
None
See application file for complete search history.

(56) References Cited

U.S. PATENT DOCUMENTS

| | | | |
|---|---|---|---|
| 7,093,515 B2 | 8/2006 | Yamanoi et al. | |
| 8,255,124 B2 | 8/2012 | Van Houten et al. | |
| 2004/0089490 A1* | 5/2004 | Yamanoi et al. | 180/271 |
| 2007/0213916 A1* | 9/2007 | Sugano et al. | 701/96 |
| 2008/0238647 A1* | 10/2008 | Abe | 340/457.1 |
| 2012/0158251 A1* | 6/2012 | Van Houtan et al. | 701/45 |
| 2012/0212353 A1* | 8/2012 | Fung et al. | 340/905 |

* cited by examiner

*Primary Examiner* — Calvin Cheung
*Assistant Examiner* — Lail Kleinman
(74) *Attorney, Agent, or Firm* — Dickinson Wright PLLC (57) ABSTRACT

A method of controlling the behavior of an occupant of a vehicle (20) includes sensing an auxiliary mode of the vehicle (20) and comparing a first vehicle operation mode to a predetermined threshold to determine a first incident. The method proceeds by actuating a resistive device (24) in response to the first incident to apply a resistance to an operational input by an occupant of the vehicle (20). The method is characterized by monitoring a precursory auxiliary mode event of the vehicle (20) subsequent to the first incident and prior to a presence of the auxiliary mode, and de-actuating the resistive device (24) in response to the precursory auxiliary mode event to remove the applied resistance.

25 Claims, 6 Drawing Sheets

METHOD AND SYSTEM FOR CONTROLLING THE BEHAVIOR OF AN OCCUPANT OF A VEHICLE

CROSS-REFERENCE TO RELATED APPLICATION

The subject invention claims priority to U.S. Provisional Patent Application Ser. No. 61/774,894 filed on Mar. 8, 2013, entitled a "Precursory Accelerator Pedal Force Removal System for a Behavioral Seat Belt Compliance Device".

BACKGROUND OF THE INVENTION

1. Field of the Invention

The subject invention relates to a method of controlling the behavior of an occupant of a vehicle with a resistive device and a control module and sensors to encourage compliance with an auxiliary mode.

2. Description of the Prior Art

Several methods are known which control the behavior of an occupant to encourage compliance with an auxiliary mode. One such example is U.S. Pat. No. 7,093,515 to Yamanoi, et al, which discloses sensing a mobilization of the vehicle and sensing a buckling state of a seat belt, i.e., an auxiliary mode of the vehicle, in response to the vehicle mobilization to identify an unbuckled state of the seat belt. The method of Yamanoi proceeds monitoring an ignition switch to determine a first incident of the vehicle when the ignition switch is turned on, and then actuating a resistive device in response to the unbuckled state of the seat belt and an on position of the ignition switch to apply a resistance to an accelerator pedal of the vehicle.

Another example is U.S. Pat. No. 8,255,124 to Van Houten, et al, which also discloses sensing a mobilization of the vehicle and sensing an auxiliary mode of the vehicle, such as a buckling state of a seat belt, in response to the vehicle mobilization to identify an absence of the auxiliary mode, such as an unbuckled state of the seat belt. The method of Van Houten proceeds by monitoring a first vehicle operation mode of the vehicle, such as a distance traveled by the vehicle, a speed or acceleration of the vehicle, or a time of vehicle mobilization, and then compares the first vehicle operation mode to a predetermined first threshold to determine a first incident of the vehicle in response to the first vehicle operation mode exceeding the first threshold. The method of Van Houten, et al then proceeds to actuate a resistive device in response to the absence of the auxiliary mode and the first incident to apply a resistance to an operational input, such as an accelerator pedal, of the vehicle.

However, each of the prior art methods require a presence of the auxiliary mode, such as a buckled state of the seat belt, to remove the applied resistance to the accelerator pedal of the vehicle. Put another way, each of the prior art methods do not de-actuate the resistive device until a complete buckling of the seat belt is detected. Accordingly, each of the prior art methods require the operator of the vehicle to establish the auxiliary mode while simultaneously encountering the applied resistance to the operational input of the vehicle. As such, the operator's safety is placed at risk because of this distracting resistance, especially when the operator is navigating the vehicle in heavy traffic. Thus, although the prior art methods are designed to encourage an occupant to operate a vehicle with a buckled seat belt, they do so at the compromise of the operator's safety and thus place the vehicle operator at risk.

SUMMARY OF THE INVENTION

The subject invention provides for monitoring a precursory auxiliary mode event of the vehicle subsequent to the first incident and prior to a presence of the auxiliary mode, and de-actuating the resistive device in response to the precursory auxiliary mode event.

Advantages of the Invention

The subject invention is advantageous because it provides for the removal of the applied resistance prior to a complete presence of the auxiliary mode so that the auxiliary mode can be safely established by the operator of the vehicle. Put another way, the subject invention is advantageous because it allows an operator of the vehicle to de-actuate the resistive device in advance of the presence of the auxiliary mode so that they can safely establish the auxiliary mode without an unpleasant and distractive applied resistance in place. As a result, the subject invention improves the safety of the applied resistance as well as improves on the acceptance of the applied resistance by the general public.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
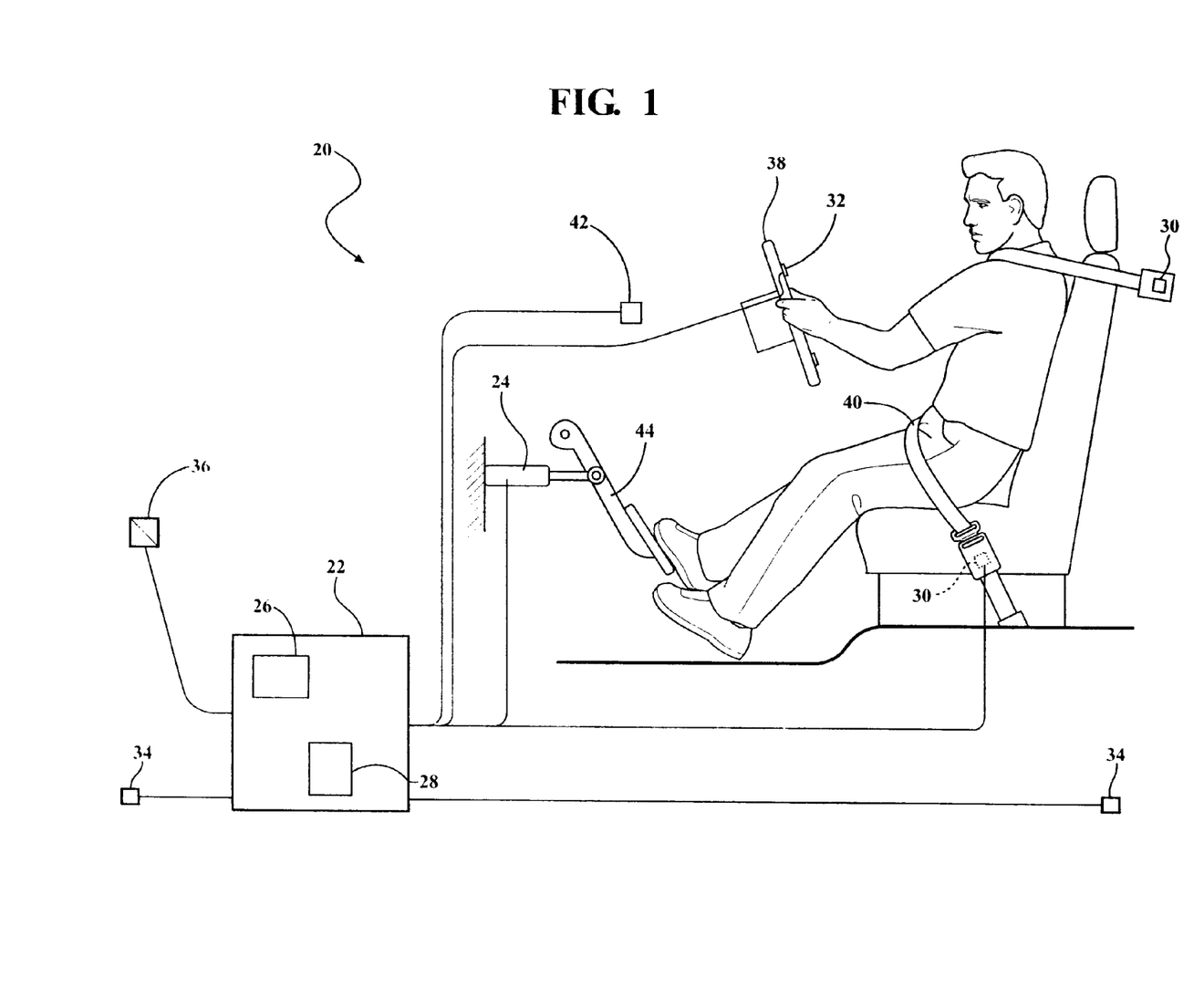
FIG. 1 illustrates a vehicle having a resistive device and a control module and a plurality of sensors for use in conjunction with the subject method of controlling a behavior of an occupant of the vehicle.
Figure 2:
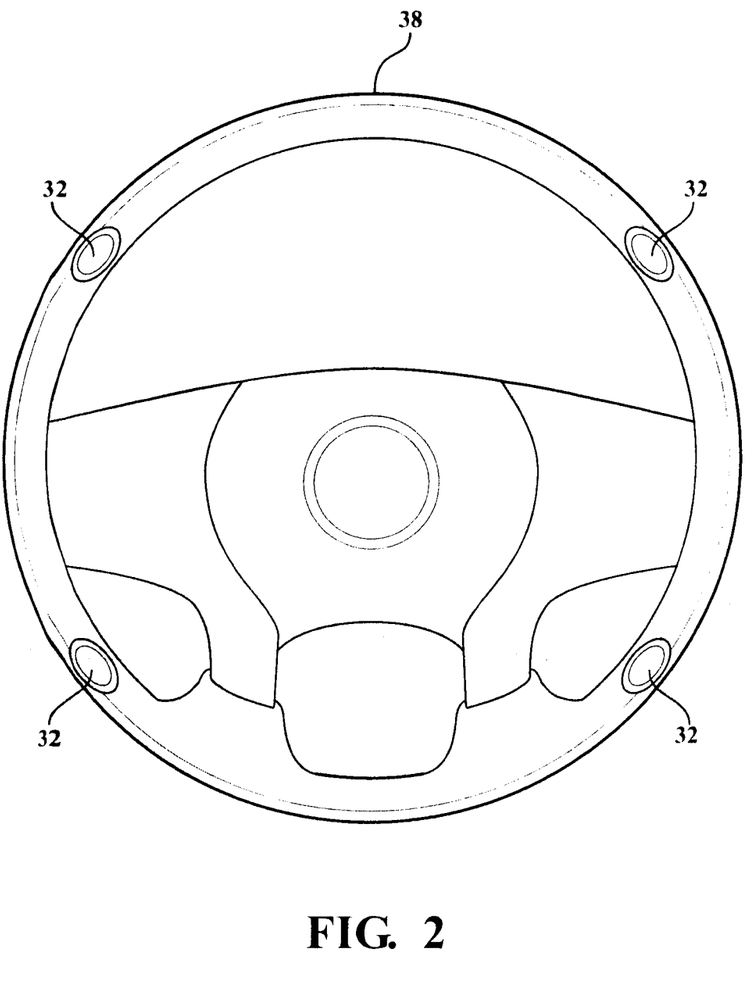
FIG. 2 illustrates a pressure sensor disposed on a steering wheel of the vehicle.

Referring to the Figures, wherein like numerals indicate like or corresponding parts throughout the several views, a vehicle 20 for use with a method of controlling the behavior of an occupant is shown in FIG. 1. The vehicle 20 could be one that travels across the ground, on tracks, on or under the water, or one that flies. The vehicle 20 is of the type including a control module 22, and a resistive device 24, and a plurality sensors 26, 28, 30, 32, 34 for sensing a plurality of operating conditions, an auxiliary mode of the vehicle 20, as well as a precursory auxiliary mode event. As shown in FIG. 1, the control module 22 is configured to receive signals and data from the plurality of sensors 26, 28, 30, 32, 34 and is also capable of processing the data and producing signals in response to the data according to a program stored on the control module 22 which directs its operation. For example, the control module 22 can include a comparator 36, where data that has been stored in the program can be compared and resolved, as well as for use in relating one set of data to another set of data to establish ratios that the control module can use in performing subsequent commands. The plurality of sensors 26, 28, 30, 32, 34 can include a time sensor 28, or timer, disposed within the control module 22 such that the comparator 36 is configured to count events, store the received data and perform calculations on the received data. As shown in FIGS. 1 and 2, the plurality of sensors 26, 28, 30, 32, 34 can include a pressure sensor 32 disposed on a steering wheel 36 of the vehicle 20. As will be described in more detail below, in an embodiment the pressure sensor 32 can be used to monitor for a precursory auxiliary mode event of the vehicle. As further shown in FIG. 1, the plurality of sensors can include at least one distance sensor 34 to sense a spacing distance between the vehicle 20 and a second vehicle traveling in front of and/or behind the vehicle 20. As such, and as will be described in more detail below, the control module 22 is configured to receive information from a variety of sources and calculate a rate of acceleration, distance, including distance from the vehicle in front and/or behind, speed, time, and end of trip. The control module 22 also includes a signal generator 42 whereby it can send signal commands to various actuators, and thus execute all of the various embodiments described in more detail below. An example of this type of control module 22 could include the ECU (engine control unit) on a contemporary automobile that receives signals from sensors located on the engine and other parts of the automobile, and uses this information to command certain vehicle components to adjust their operation, such as increasing air-fuel mixture into the engine.

Figure 3:
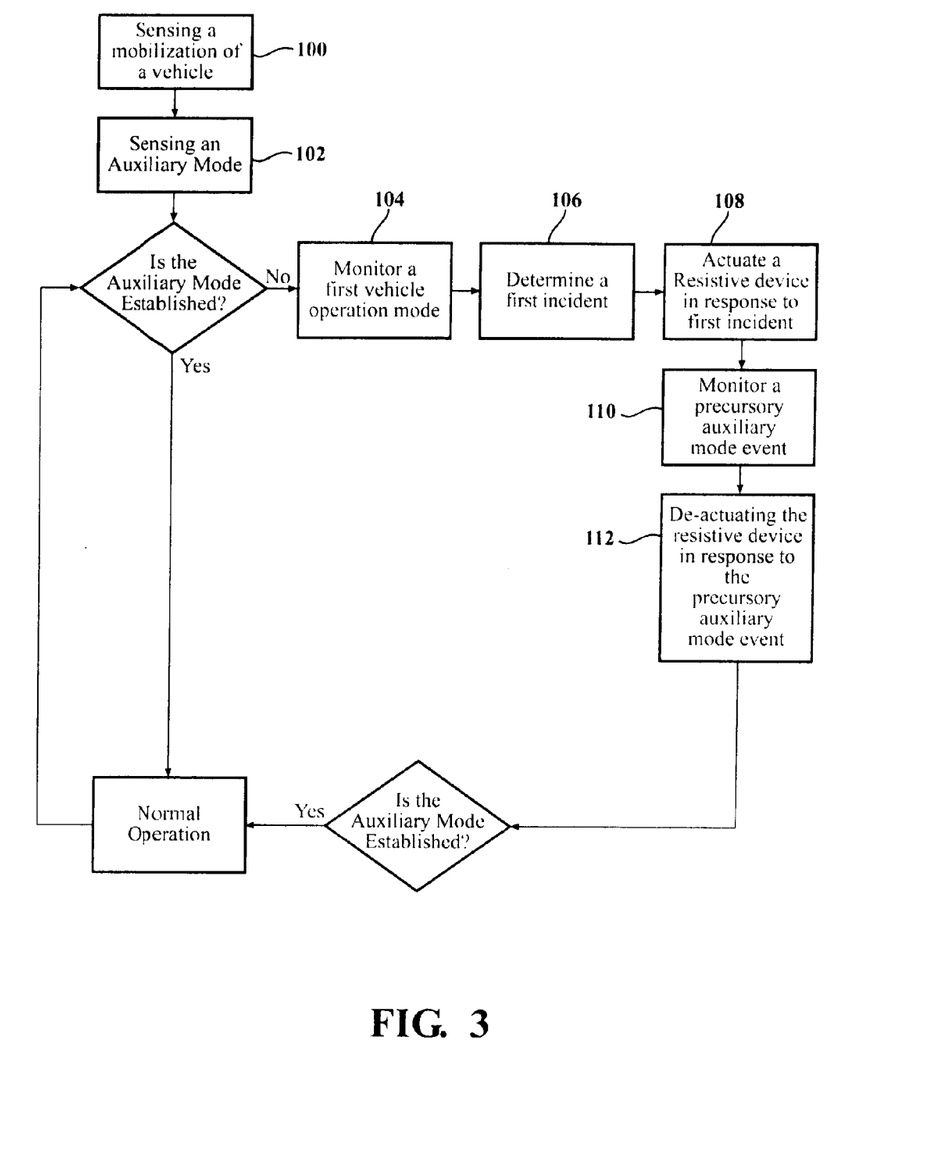
FIG. 3 is a flow diagram of a preferred embodiment of the method which illustrates monitoring a precursory auxiliary mode event of the vehicle subsequent to the first incident and prior to a presence of the auxiliary mode, and de-actuating the resistive device in response to the precursory auxiliary mode event.

As shown in FIG. 3, the method of controlling the behavior of the occupant includes the step of 100 sensing a mobilization of the vehicle 20, such as that which may result from an application of an operational input of force by the occupant to an accelerator 44 in the vehicle. The accelerator 44 may be a pedal, lever, or toggle generating rotational motion or translational motion that communicates either mechanically or electronically, directly or indirectly (as through a control module 22 that receives multiple inputs) to a fluid delivery system (for example a throttle, or fuel pump) or an electric power supply in order to change the power output of a motor or engine. For example, in a typical automobile, the accelerator 44 is a foot pedal, and when an occupant of the vehicle 20 depresses it, an electronic signal opens the throttle of the engine, which allows more air-fuel mixture to flow into the engine, which increases the power output of the engine. As is well known, the occupant of the vehicle 20 typically applies a force to the accelerator 44 by hand or by foot to increase a speed of the vehicle 20 in proportion to the applied force.

In the preferred embodiment, the plurality of sensors 26, 28, 30, 32, 34 can include a speed sensor 26 for sensing a vehicle speed that results from the application of force to the accelerator pedal 44, and may be of the type commonly used on automobiles where the rotational speed of a rotating member (for example a wheel disk, or transmission output shaft) is measured, a pressure-differential type used by aircraft and watercraft, or a comparative positioning device that uses change in location measured by a satellite to calculate speed. In response to sensing a mobilization of the vehicle, the method proceeds by 102 sensing an auxiliary mode of the vehicle 20 to identify an absence of the auxiliary mode. The auxiliary mode includes any desired vehicle operation condition of which compliance by the occupant of the vehicle is required or desired during operation of the vehicle. For example, the auxiliary mode of the vehicle can include sensing whether or not an auxiliary device, such as a seat belt 40 or a gas cap, is in an engaged position. In this embodiment, and as shown in FIG. 1, the plurality of sensors can include a seat belt sensor 30 for sensing if the seat belt is fastened, the length of seat belt 40 that has been pulled out, as well as any pulls or tugs on the seat belt 40 by the operator. Although not expressly shown the seat belt sensor 30 can also be disposed on a passenger's seat to sense if the passenger's seat belt is fastened. The seat belt sensor 30 can include a position transducer, such as a potentiometer to translate a change in the physical position of an object into an electrical signal that can be magnified and interpreted by the control module 26. A proximity switch or Hall-effect sensor could be used to detect the absence or presence of an object, such as a belt buckle being fully inserted into a receptacle and communicate it through an electrical signal to the control module 22. Also, a light emitter aimed at the seat belt 40 with a reflector on the seat belt 40 and a phototransistor to receive the reflected light could be used to detect if the seat belt 40 is fastened in front of the occupant. However, as mentioned above, the auxiliary mode can also include the sensing of any additional auxiliary devices or the sensing of any additional behaviors that warrant encouragement of engagement for participation by the occupant to establish safe vehicle operation.

In the situation where the auxiliary mode includes a sensing of a seat belt 40 of either the driver or the passenger, the seat belt 40 can be of the well-known type including a system of straps anchored securely in the vehicle 20 to maintain a vehicle occupant in a position within the vehicle 20 when engaged by snap and lock connectors, fasteners, buckles, or the like. A typical example of the normal operation of the seat belt 40 in vehicles, such as automobiles and aircraft, is for an occupant of the vehicle to enter the vehicle 20, position himself/herself in a seat or bench, and then fasten the provided seat belt 40 from one side of their body across their lap and also perhaps across the front of their body from the shoulder to their hip into a receptacle that will hold the seat belt 40 securely, even if the vehicle 20 is involved in a violent jarring or collision.

As shown in FIG. 3, in response to identifying an absence of the auxiliary mode, such as the absence of a buckled seat belt 40 by the driver and/or the passenger, the method proceeds by 104 monitoring a first vehicle operation mode of the vehicle. In the preferred embodiment, the first vehicle operation mode can include monitoring a mobilization period of time, monitoring a distance traveled by the vehicle, monitoring the speed of the vehicle, or any additional operational characteristic of the vehicle which may require monitoring. The mobilization period of time and the distance traveled by the vehicle are best defined from an initial start of vehicle motion. However, the time period or the distance traveled can also be determined in relation to any desired initial event, such as by an actuation of the vehicle 20, by way of a starter or an ignition switch.

The method proceeds by having the comparator 36 of the control module 22 perform a 106 comparing of the first vehicle operation mode to a predetermined first threshold to determine a first incident of the vehicle in response to the first vehicle operation mode exceeding the predetermined first threshold. In the situation where the first vehicle operation mode is a mobilization period of time, the predetermined first threshold includes a predetermined first mobilization period. In the situation where the first vehicle operation mode is a distance traveled by the vehicle, the predetermined first threshold includes a predetermined first distance threshold. In the situation where the first vehicle operation mode is a speed of the vehicle, the predetermined first threshold includes a predetermined first speed threshold.

As shown in FIG. 3, once the control module determines the first incident, the control module proceeds to 108 actuate the resistive device 24 in response to both the absence of the auxiliary mode and the first incident to apply a resistance to an operational input of the vehicle. As is well known in the art, vehicles contain at least one occupant input device which requires the occupant to apply an operational input to operate same. These input devices can include an accelerator pedal 44, a shifter, an on/off button of an electronic device such as a radio, an operational mode such as an air-conditioning fan speed, or an audible level of the radio. Accordingly, the applied resistance is an application of resistance to these types of operational inputs to affirmatively encourage the occupant to comply with the desired auxiliary mode. For example, the movement of the shifter may be blocked, the depressing of the accelerator pedal 44 may be met with resistance, or the adjusting of a volume or operation level control may be met with greater resistance. Additional examples could also include the presentation of visual or audio alarms within the vehicle 20.

The following example illustrates the method wherein the operational input device is an accelerator pedal 44 and the auxiliary mode is the fastening of a seat belt 40. In normal operation, for example, the occupant enters the vehicle 20 and fastens the seat belt 40 before operating the vehicle 20 beyond the first threshold, which may be a relatively low vehicle speed. In this case, no resistance is applied to the application of force to the accelerator pedal 44. However, if the occupant operates the vehicle 20 beyond the first threshold speed without having the seat belt 40 fastened and disposed about him or the passenger, then the occupant will need to apply more force to the accelerator 44 to achieve the desired vehicle speed.

The resistance to the operational input may be applied by a spring, a fluid damper, a stepper motor with a rack and pinion, an air pressure or vacuum system, a small powerful motor, or a system using any combination of these elements. Resistance could be actuated or removed on a spring-type system by either a hydraulic cylinder or a motor and gear system moving the anchor point of the spring from a home position where the spring offers little or no resistance to positions of increased spring tension, providing higher resistance. In a damper type, the amount of incompressible fluid in the reservoir could be increased or decreased using a fluid pump and valves to change the amount of resistance.

As shown in FIG. 3, in response to actuating the resistance device, the method proceeds by 110 monitoring for a precursory auxiliary mode event of the vehicle 20 subsequent to the first incident and prior to a presence of the auxiliary mode, and then 112 de-actuating the resistive device in response to the precursory auxiliary mode event to remove the applied resistance. In the preferred embodiment, the precursory auxiliary mode event is an arbitrary behavior that can be easily executed by an operator or passenger of a vehicle 20 to signal an initiation by the operator or the passenger of establishing the presence of the auxiliary mode. Put another way, the precursory auxiliary mode event is an event which takes place after the first incident, but prior to a complete and full establishment of the auxiliary mode. Once the subject method senses the precursory auxiliary mode event, the method proceeds to de-actuate the resistive device so that the operator can safely establish the auxiliary mode without an unpleasant and distractive applied resistance in place. The de-actuation of the resistive device causes the applied resistance to be faded out and/or removed completely.

For example, if the auxiliary mode is a fastening of the seat belt 40 of the vehicle 20, the precursory auxiliary mode event could include an initial pull of the seat belt 40 by the operator or passenger as well as a removal of the operational input of force to the accelerator pedal 44. Alternatively, the precursory auxiliary mode event could include the application of pressure to the pressure sensor 32 disposed on the steering wheel 38 of the vehicle 20. When the precursory auxiliary mode event is implemented by the pressure sensor 32, this arrangement allows the operator to quickly squeeze the steering wheel 38, and thus the pressure sensor 32 embedded therein, to signal an initiation of the auxiliary mode. Other precursory auxiliary mode events associated with the steering wheel 38 could include application of body heat to a heat sensor disposed on the steering wheel 38, or a touching of a touch sensor disposed on the steering wheel 38. In any event, precursory auxiliary mode events that are associated with the steering wheel 38 are advantageous because the hands of the operator of the vehicle 20 are almost always in contact with the steering wheel 38. Moreover, the steering wheel 38 of the vehicle 20 is not a distractive stimulus, and thus does not compromise the operator's safety.

Figure 4:
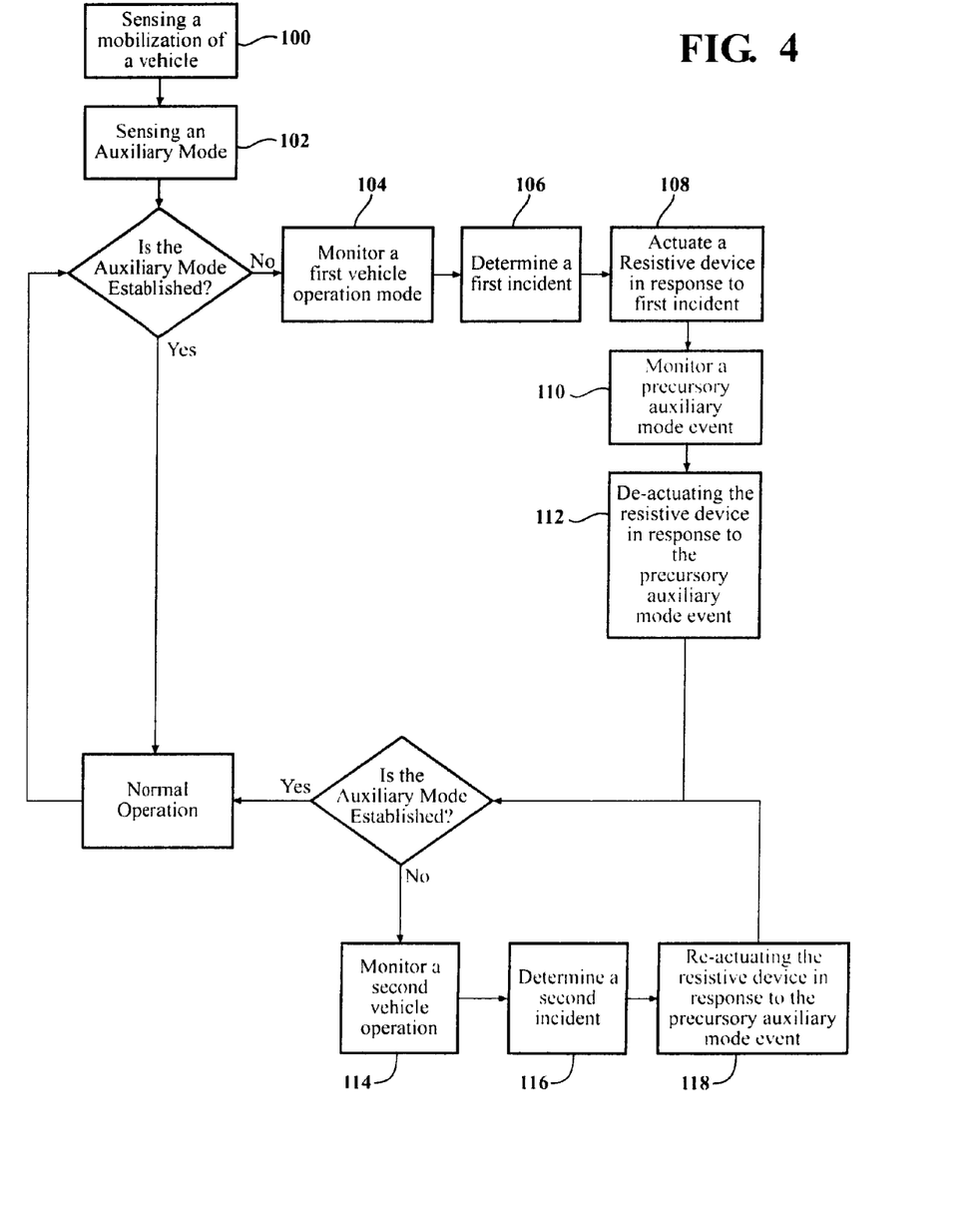
FIG. 4 is a flow diagram of an additional embodiment of the method which illustrates monitoring a second vehicle operation mode subsequent to the precursory auxiliary mode event, and re-actuating the resistive device in response to a second incident and the continued absence of the auxiliary mode.

In a preferred embodiment, and as further shown in FIG. 4, the subject method also includes steps to insure that the operator or passenger is establishing a presence of the auxiliary mode within a sufficient period of time subsequent to the precursory auxiliary mode event. Put another way, the subject method also includes steps to insure that the operator or passenger is not actuating or initiating a precursory auxiliary mode event, but then continuing to ignore the establishment of the presence of the auxiliary mode. Accordingly, if the control module 22 senses that the auxiliary mode is still not established, the subject method proceeds by 114 monitoring a second vehicle operation mode of the vehicle subsequent to the precursory auxiliary mode event, and having the comparator 36 of the control module 22 perform a 116 comparing of the second vehicle operation mode to a predetermined second threshold to determine a second incident of the vehicle in response to the second vehicle operation mode exceeding the predetermined second threshold. If the control module senses the second incident, and also senses a continued absence of the auxiliary mode since the precursory auxiliary mode event, the control module proceeds to 118 re-actuate the resistive device 24. If after re-actuation of the resistive device 24 the control module 22 senses the establishment of the auxiliary mode, the method proceeds by allowing the vehicle 20 to continue under normal operation, i.e., in the absence of the applied resistance.

In the preferred embodiment, the step of monitoring the second vehicle operation mode could include monitoring a precursory period of time since the precursory auxiliary mode event, monitoring a speed or acceleration of the vehicle since the precursory auxiliary mode event, monitoring a distance traveled by the vehicle since the precursory auxiliary mode event, or monitoring a spacing distance between the vehicle and a second vehicle traveling in front of or behind the vehicle.

In the event the subject method monitors for a precursory period of time since the precursory auxiliary mode event, the control module also establishes a precursory time incident associated with the precursory auxiliary mode event using the time sensor 28. Put another way, the control module creates a time stamp associated with the precursory auxiliary mode event. This precursory time incident, or time stamp, is then used by the control module 22 to determine how much time has passed since the precursory auxiliary mode event, i.e., the precursory period of time. The method then proceeds by having the comparator 36 of the control module 22 compare the precursory period of time to a predetermined precursory time threshold which is considered sufficient to establish the presence of the auxiliary mode by the operator. If the precursory period of time exceeds the predetermined precursory time threshold, the control module 22 proceeds to re-actuate the resistive device if the auxiliary mode continues to be absent. Accordingly, the subject method ensures that the operator does in fact establish a presence of the auxiliary mode in a sufficient period of time following the triggering or initiation of the precursory auxiliary mode event, and if not, re-establishes the applied resistance to the operational input.

In the event the subject method monitors for either a speed or acceleration of the vehicle since the precursory auxiliary mode event using the speed sensor 26 and the control module 22, the method proceeds to have the comparator 36 of the control module 22 compare the speed or acceleration of the vehicle 20 to a predetermined auxiliary event speed threshold or a predetermined auxiliary event acceleration threshold, respectively. The predetermined auxiliary event speed or acceleration thresholds are used in the subject method to ensure that the operator of the vehicle 20 is not operating the vehicle 20 at an unsafe speed or acceleration while attempting to establish the presence of the auxiliary mode. If the comparator 36 senses that the speed or acceleration of the vehicle 20 after the precursory auxiliary mode event exceeds the predetermined auxiliary event speed or acceleration threshold, the control module 22 proceeds to re-actuate the resistive device if the auxiliary mode is still absent. Accordingly, the subject method ensures that the operator is not operating the vehicle 20 at unsafe speeds or acceleration while establishing the auxiliary mode, and/or operating the vehicle 20 at speeds or acclerations which tend to suggest that the auxiliary mode will not be established.

In the event the subject method monitors a distance traveled by the vehicle 20 since the precursory auxiliary mode event, the control module also establishes a precursory time incident associated with the precursory auxiliary mode event using the time sensor 28. Put another way, the control module 22 creates a time stamp associated with the precursory auxiliary mode event. This precursory time incident, or time stamp, is then used by the control module 22 to determine how far the vehicle 20 has travelled since the precursory auxiliary mode event. The method then proceeds by having the comparator 36 of the control module 22 compare the distance traveled by the vehicle 20 since the precursory auxiliary mode event to a predetermined precursory distance threshold considered a sufficient distance in which to establish the presence of the auxiliary mode by the operator. If the traveled distance exceeds the predetermined precursory distance threshold, the control module proceeds to re-actuate the resistive device 24 if the auxiliary mode continues to be absent. Accordingly, the subject method ensures that the operator or passenger does in fact establish a presence of the auxiliary mode within a sufficient distance following the triggering or initiation of the precursory auxiliary mode event, and if not, re-establishes the applied resistance to the operational input.

In the event the subject method monitors a spacing distance between the vehicle 20 and a second vehicle traveling in front of or behind the vehicle using the distance sensor, the method proceeds to have the comparator 36 of the control module 22 compare the measured spacing distance to a predetermined safe vehicle distance. The predetermined safe vehicle distance is used in the subject method to ensure that the operator of the vehicle 20 is not operating the vehicle 20 at an unsafe distance to a second vehicle traveling in front of or behind the vehicle while establishing the presence of the auxiliary mode. As such, the subject method re-actuates the resistive device 24 in response to the measured spacing distance after the precursory auxiliary mode event relative to the predetermined safe distance threshold. Accordingly, while the subject method motivates an operator of the vehicle 20 to establish the auxiliary mode as soon as possible, it does so while also managing a risk of the vehicle 20. In other words, the subject method includes steps to prevent encouragement of establishing the auxiliary mode during un-safe operating conditions.

In an embodiment, the predetermined safe vehicle distance threshold includes a predetermined safe front distance threshold and a predetermined safe rear distance threshold. If the comparator 36 senses that the measured front spacing distance between the vehicle 20 and a second vehicle traveling in front of the vehicle 20 is less than the predetermined safe front distance threshold, the control module proceeds to re-actuate the resistance device 24. Thus, the subject method applies the resistance in an attempt to slow the operator of the vehicle 20 down and increase the distance between the vehicle 20 and a second vehicle traveling in front of the vehicle. If the comparator 36 senses that the measured rear spacing distance between the vehicle 20 and a second vehicle traveling in back of the vehicle is less than the predetermined safe rear distance threshold, the control module 22 overrides the re-actuating of the resistive device step. Thus, the subject method delays the re-actuation of the resistive device to provide the operator of the vehicle 20 an opportunity to speed up until a safe distance between the vehicle 20 and the second vehicle traveling in back of the vehicle can be established. Thus, if the auxiliary mode is a buckling of the seat belt 40, the predetermined safe vehicle distances are used in the subject method to avoid encouraging an in-motion un-buckled operator to buckle up under hazardous conditions.

As noted above, the precursory auxiliary mode event could include a removal of the operational input of force to the accelerator pedal 44, i.e., an operator lifting his/her foot off the accelerator pedal 44. In this situation, it is advantageous to de-actuate the resistive device even in the absence of the auxiliary mode so that when the operator reapplies the force to the accelerator pedal 44, the operator does not encounter an applied resistance. As such, the subject method also addresses a lack of kinesthetic feedback which is present in the prior art methods. Put another way, the prior art methods lack kinesthetic feedback because an operator places force on a fully extended accelerator pedal 44 with applied accelerator pedal resistance already in place. Thus, in the subject method, the driver will not encounter imposed force until after an accelerator pedal 44 is depressed. Once depressed, the subject method will gradually fade in or re-apply the applied resistance according to the steps mentioned herein at a pace that maximizes the feedback received by the driver. This will allow a continuum of equilibrium between applied resistance and the counter-force exerted by the operator, thus reducing the tendency to under or over accelerate the vehicle 20. As such, the subject method steps improve the safety of the operator.

Figure 5:
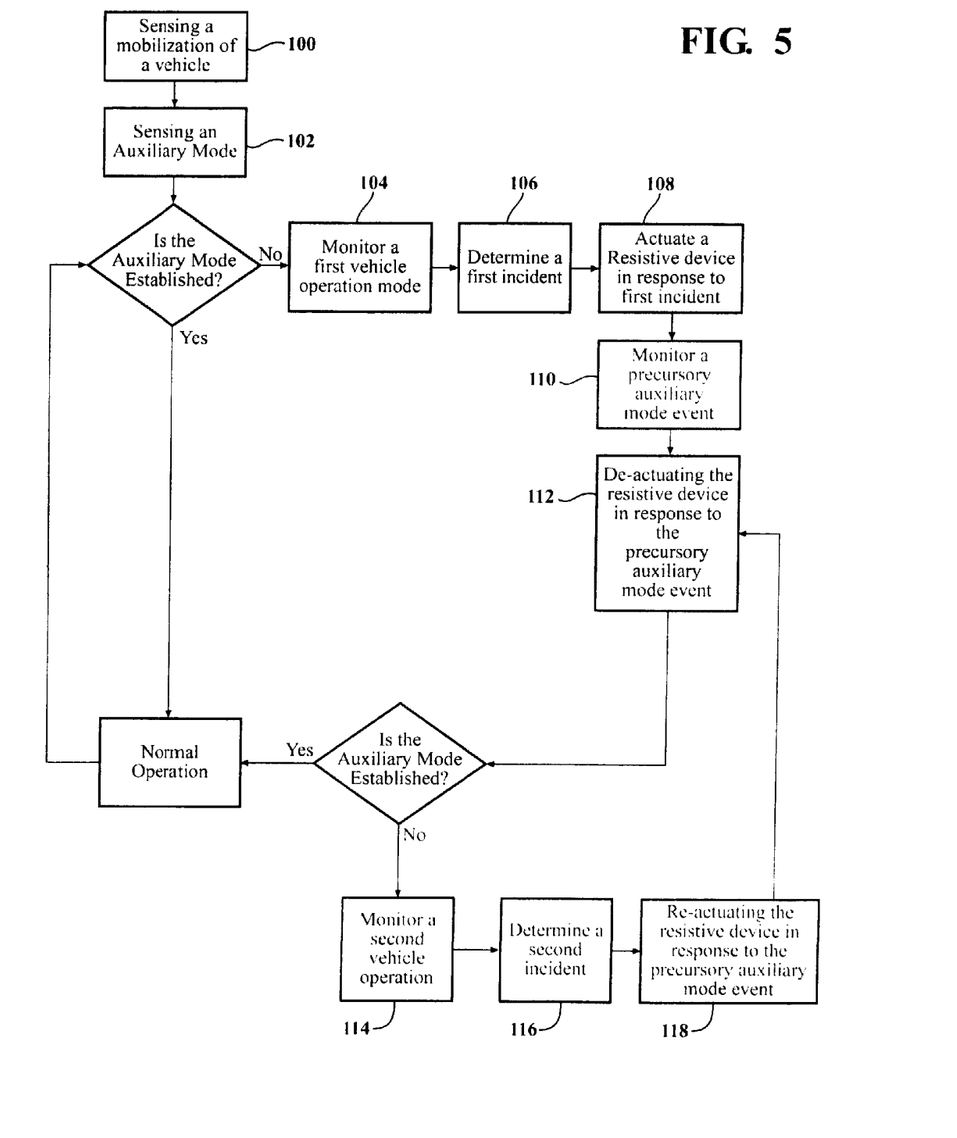
FIG. 5 is a flow diagram of an additional embodiment of the method which illustrates monitoring for an additional precursory auxiliary mode event subsequent to the second incident, and de-actuating the resistive device in response to the additional precursory auxiliary mode event.

In a preferred embodiment, and as further shown in FIG. 5, the subject method also can proceed to 110 monitor for an additional precursory auxiliary mode event subsequent to the second incident and prior to the presence of the auxiliary mode. Put another way, after the resistive device 24 is re-actuated in response to the second incident and the continued absence of the auxiliary mode, the subject method proceeds to monitor for another subsequent precursory auxiliary mode event executed by the operator of the vehicle 20 to signal an initial establishment of the presence of the auxiliary mode. If the control module senses the additional precursory auxiliary mode event, the control module proceeds to 112 de-actuate the applied resistance. Accordingly, even though the operator did not establish the auxiliary mode within a sufficient period of time following the first precursory auxiliary mode event, the operator is provided with an additional opportunity to establish the auxiliary mode in the absence of the applied resistance.

As with the precursory auxiliary mode event, the additional precursory auxiliary mode event is an arbitrary target behavior that can be easily executed by an operator of a vehicle to signal an initiation of establishing the presence of the auxiliary mode. For example, if the auxiliary mode is a fastening of the seat belt of the vehicle, the additionally precursory auxiliary mode event could once again include an initial pull of the seat belt 38 by the operator or passenger as well as a removal of the operational input of force to the accelerator pedal 42. Alternatively, the additional precursory auxiliary mode event could include the application of pressure to the pressure sensor 32 disposed on the steering wheel 38 of the vehicle 20.

Figure 6:
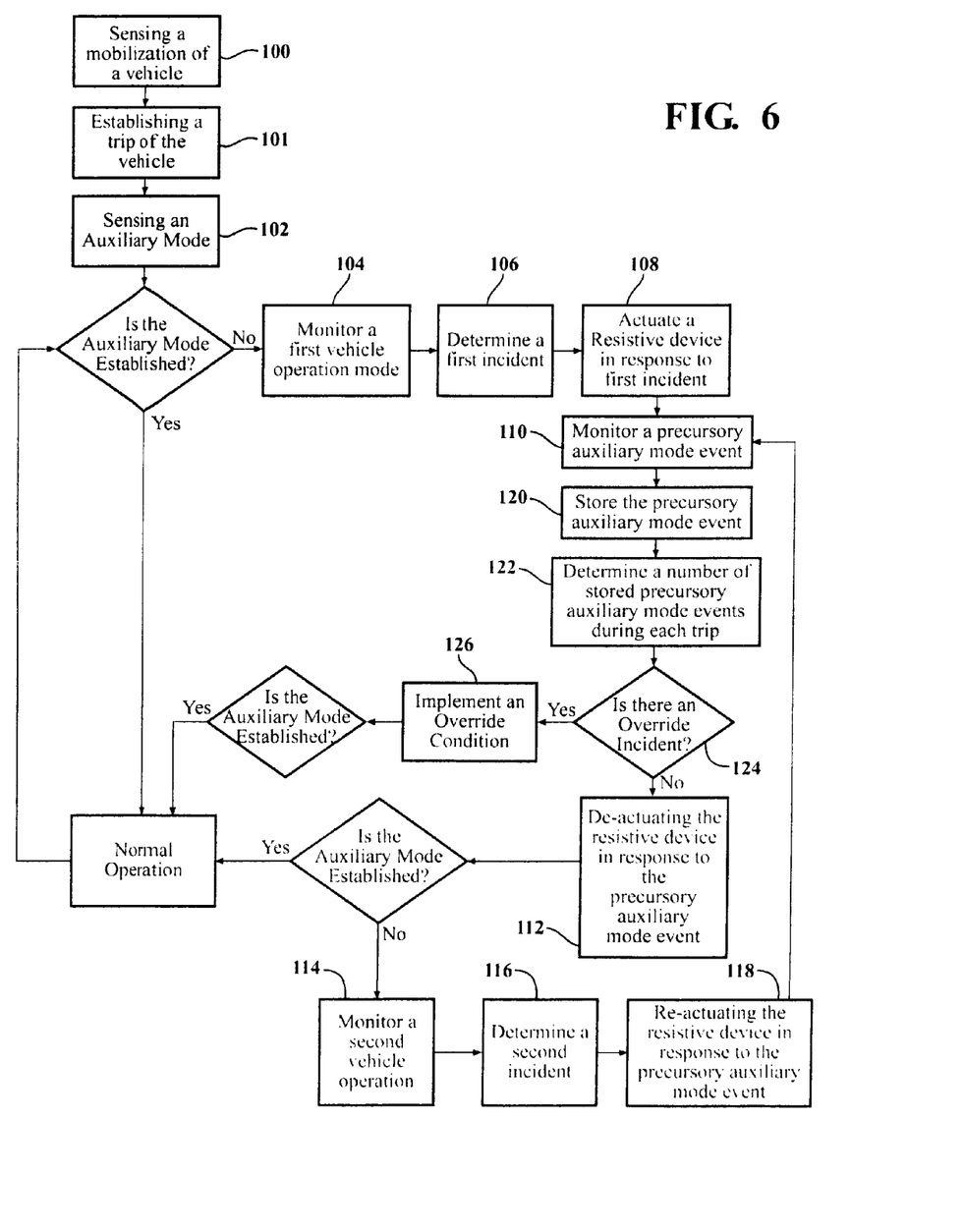
FIG. 6 is a flow diagram of an additional embodiment of the method which illustrates implementing an override condition in response to an override incident.

In a preferred embodiment, the subject method also includes steps to insure that the operator or passenger is not repeatedly de-activating the resistive device 24 in an attempt to continuously operate the vehicle in the absence of the auxiliary mode. Put another way, the subject method includes steps to insure that the operator or passenger is not serially initiating or establishing an additional precursory auxiliary mode event, but then continuing to follow through with an establishment of the auxiliary mode. Accordingly, as best shown in FIG. 6, in this embodiment a trip of the vehicle is established, and after each precursory auxiliary mode event the subject method proceeds to 120 store each of the precursory auxiliary mode events which occur during the trip in control module 22. The control module 22 then proceeds to 122 determine a number of stored precursory auxiliary mode events, and the comparator 36 of the control module 22 compares the number of stored precursory auxiliary mode events to a predetermined mode event number threshold to 124 determine an override incident in response to the number of precursory auxiliary mode events during the trip exceeding the predetermined auxiliary mode event number threshold. Put another way, the subject method implements a reasonable number of precursory auxiliary mode events that can occur within any given trip, and determines if this reasonable number has been exceeded. If the control module 22 senses the override incident, the control module proceeds to 126 implement an override condition for a remaining duration of the trip, in which the subject method overrides the steps of monitoring for the additional precursory auxiliary mode event and de-actuating the resistive device in response to the override incident. In another embodiment, if the control module 22 senses the override incident, the control module 22 could proceed to make it more difficult, if not impossible, to apply pressure to the pressure sensor 32 disposed on the steering wheel 38. In any event, once the operator has exceeded a predetermined number of precursory auxiliary mode events without the establishment of the auxiliary mode, the subject method prevents the operator or passenger from de-actuating the resistive device short of establishing the auxiliary mode. If the control module does not sense the override incident, the subject method proceeds with the aforementioned method steps by de-actuating the resistive device 24.

In the preferred embodiment, a variety of means could be used to define a trip. For example, the trip could commence when the vehicle 20 is mobilized and end when the vehicle 20 is de-mobilized. In one embodiment, the mobilization and de-mobilization could be defined by an on/off position of an ignition of the vehicle 20. In another embodiment, the mobilization could be defined by an initial movement of the vehicle 20 and the de-mobilization could be defined by a cease of the movement of the vehicle 20 for a predetermined period of time. In another embodiment, the trip could begin when a weight sensor in the operator's or passenger's seat registers a predetermined weight and end when the weight sensor registers that no weight is present in the operator's or passenger's seat for a predetermined period of time.

In any of the aforementioned embodiments, if at any time following application of the resistance device 24, the control module 22 senses an establishment of the auxiliary mode, such as for example the buckling of the seat belt 40, the control module can remove the applied resistance applied to the operational input of force. In addition, the removal of the resistance can be done so gradually to prevent a sudden acceleration of the vehicle. At this point, it should be understood that the method provides an incentive for compliance with the auxiliary mode and thus helps to accomplish safe operation of the vehicle 20 by the occupant. In addition, the method continually monitors for an absence of the auxiliary mode during mobilization of the vehicle 20. Said another way, if the vehicle 20 is initially operated with the auxiliary mode established, and thus the resistance is not applied, if the auxiliary mode is later disengaged during vehicle mobilization, then the resistance can be applied if the first operating mode also meets exceeds the first predetermined threshold.

In any of the embodiments disclosed above, the control module 22 actuates the resistive device 24 to remove the resistance to the application of the operational input of force to the accelerator pedal 44 in the presence of the auxiliary mode. However, the removal of the resistance to the application of the operational input of force to the accelerator pedal 44 can be prevented until the operational mode of vehicle speed falls below a second predetermined threshold. In other words, the resistance is removed when the occupant of passenger satisfies the auxiliary mode or the desired operating conditions. As mentioned previously, in the seat belt 40 and accelerator pedal 44 example, the resistance applied to the application of the accelerator pedal 44 will be removed once the seat belt 40 is fastened and other desired operating conditions are met. For vehicle safety, and as mentioned above, it may not be safe for the occupant to fasten the seat belt 40 until an operational mode such as vehicle speed is below a predetermined threshold or the vehicle is traveling at a safe distance from a second vehicle traveling in front of or behind the vehicle. This is a great advantage in vehicles 20 where an occupant's appendages must remain on the vehicle operational inputs or disposed in some other way to maintain safety. The occupant is encouraged so that the vehicle 20 complies with desired operating conditions, but not in a way that can cause greater harm or danger.

Additionally, the subject method and system could easily be applied to an autonomous vehicle without changing the above-mentioned description. In the event the subject method is applied to an autonomous vehicle capable of being driven automatically in an autonomous mode, the operational input could be a manual mode of the vehicle. In this embodiment, when the control module 22 senses the first incident as well as an absence of the auxiliary mode, the control module 22 could shift the autonomous vehicle from the autonomous driving mode to the manual driving mode to require the operator to manually operate the autonomous vehicle if the auxiliary mode is not established, i.e., an applied resistance to the operational input. Once in manual mode, the method could additionally proceed to apply a resistive force to the accelerator pedal 44 to additionally encourage the operator of the autonomous vehicle to establish the auxiliary mode. A shifting of the autonomous vehicle from the autonomous mode could be controlled by a timer, speed, rate of acceleration, distance, including distance from the vehicle in front and/or vehicle behind, or any combination of these variables. Following compliance with the auxiliary mode, the control module 22 could return to the autonomous vehicle 20 to the autonomous driving mode, either automatically or at the driver's discretion. The control module 22 could also initiate a stimuli, such as a visual or auditory stimuli, which would signal to the operator that the shift to the manual driving mode was going to take place. Following the stimulus presentation, the shift could be immediate or set by a countdown time. It should be noted that the warning stimuli and the reinstatement stimuli could be of any nature as long as saliency was preserved.

Obviously, many modifications and variations of the present invention are possible in light of the above teachings. The invention maybe practiced otherwise than as specifically described within the scope of the appended claims, wherein that which is prior art is antecedent to the novelty set forth in the "characterized by" claims. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty has utility.

What is claimed is:

1. A method of controlling the behavior of an occupant of a vehicle with a resistive device and a control module and sensors to encourage compliance with an auxiliary mode comprising the steps of:
   sensing a mobilization of the vehicle,
   sensing an auxiliary mode of the vehicle in response to the vehicle mobilization to identify an absence of the auxiliary mode,
   monitoring a first vehicle operation mode of the vehicle,
   comparing by the control module the first vehicle operation mode to a predetermined first threshold to determine a first incident of the vehicle in response to the first vehicle operation mode exceeding the predetermined first threshold,
   actuating the resistive device in response to the absence of the auxiliary mode and the first incident to apply a resistance to an operational input of the vehicle,
   monitoring a precursory auxiliary mode event of the vehicle subsequent to the first incident and prior to a presence of the auxiliary node; and
   de-actuating the resistive device in response to the precursory auxiliary mode event to remove the applied resistance.

2. A method as set forth in claim further comprising:
   sensing a continued absence of the auxiliary mode since the precursory auxiliary mode event;
   monitoring a second vehicle operation mode of the vehicle subsequent to the precursory auxiliary mode event;
   comparing by the control module the second vehicle operation mode to a predetermined second threshold to determine a second incident of the vehicle in response to the second vehicle operation mode exceeding the predetermined second threshold; and
   re-actuating the resistive device in response to the second incident and the continued absence of the auxiliary mode.

3. A method as set forth in claim 2 further comprising:
   establishing by the control module a precursory time incident associated with the precursory auxiliary mode event;
   wherein the step of monitoring a second vehicle operation mode includes monitoring a precursory period of time since the precursory, auxiliary mode event;
   wherein the step of comparing the second vehicle operation mode to a predetermined second threshold includes comparing the precursory period of time to a predetermined precursory time threshold; and
   wherein the step of re-actuating the resistive device includes re-actuating the resistive device in response to the precursory period of time exceeding the predetermined precursory time threshold.

4. A method as set forth in claim 2 further comprising:
   wherein the step of monitoring a second vehicle operation mode includes monitoring a travel distance traveled by the vehicle since the precursory auxiliary mode event;
   wherein the step of comparing the second vehicle operation mode to a predetermined second threshold includes comparing the monitored travel distance since the precursory auxiliary mode event to a predetermined auxiliary distance threshold:
   wherein the step of re-actuating the resistive device includes re-actuating the resistive device in response to the monitored travel distance since the precursory auxiliary mode event exceeding the predetermined auxiliary distance threshold.

5. A method as set forth in claim 2 further comprising:
   wherein the step of monitoring a second vehicle operation mode includes monitoring a speed of the vehicle after the precursory auxiliary mode event using a speed sensor;
   wherein the step of comparing the second vehicle operation mode to a predetermined second threshold includes comparing the vehicle speed after the precursory auxiliary mode event to a predetermined auxiliary event speed threshold; and
   wherein the step of re-actuating the resistive device includes re-actuating the resistive device in response to the vehicle speed after the precursory auxiliary mode event exceeding the predetermined auxiliary event speed threshold.

6. A method as set forth in claim 2 further comprising:
   wherein the step of monitoring a second vehicle operation mode includes monitoring an acceleration of the vehicle slier the precursory auxiliary mode event using a speed sensor and the control module;
   wherein the step of comparing the second vehicle operation mode to a predetermined second threshold includes comparing the acceleration after the precursory auxiliary mode event to a predetermined auxiliary event acceleration threshold;
   wherein the step of reactivating the resistive device includes reactivating the resistive device in response to the acceleration after the precursory auxiliary mode event exceeding the predetermined auxiliary event acceleration threshold.

7. A method as set forth in claim 2 further comprising:
   wherein the step of monitoring a second vehicle operation mode includes measuring a spacing distance between the vehicle and a second vehicle traveling in front of or behind the vehicle using a distance sensor:

wherein the step of comparing the second vehicle operation mode to a predetermined second threshold includes comparing the measured spacing distance to a predetermined safe distance threshold;

wherein the step of re-actuating the resistive device includes re-actuating the resistive device in response to the measured spacing distance after the precursory auxiliary mode event relative to the predetermined safe distance threshold.

8. A method as set forth in claim 7 further comprising:
wherein the predetermined safe vehicle distance threshold includes a predetermined safe from distance threshold; and
wherein the step of comparing the measured spacing distance to a predetermined safe distance threshold includes comparing a measured from spacing distance between the vehicle and a second vehicle traveling in front of the vehicle to the predetermined safe from distance threshold; and
wherein the step of re-actuating the resistive device includes re-actuating the resistive device in response to the measured spacing distance being less than the predetermined sate front distance threshold.

9. A method as set forth in claim 7 further comprising:
wherein the predetermined safe vehicle distance threshold includes a predetermined safe rear distance threshold; and
wherein the step of comparing the measured spacing distance to a predetermined safe distance threshold includes comparing a measured rear spacing distance between the vehicle and a second vehicle traveling in back of the vehicle to the predetermined safe rear distance threshold; and
overriding the step of re-actuating the resistive device in response to the measured spacing distance being less than the predetermined safe rear distance threshold.

10. A method as set forth in claim 2 further comprising:
monitoring for an additional precursory auxiliary mode event subsequent to the second incident and prior to the presence of the auxiliary mode; and
de-actuating the resistive device in response to the additional precursory auxiliary mode event.

11. A method as set forth in claim 10 further comprising:
establishing a trip of the vehicle;
storing each of the precursory auxiliary mode events which occur during the trip in the control module;
determining a number of stored precursory auxiliary mode events;
comparing by the control module the number of stored precursory auxiliary mode events to a predetermined auxiliary mode event number threshold to determine an override incident in response to the number of precursory auxiliary mode events during the trip exceeding the predetermined auxiliary mode event number threshold; and
implementing an override condition of the vehicle in response to the override incident.

12. A method as set forth in claim 11 further comprising:
wherein the override condition includes overriding the steps of monitoring for the additional precursory auxiliary mode event and de-actuating the resistive device in response to the override incident.

13. A method as set forth in claim 10 further comprising:
sensing a demobilization of the vehicle; and
wherein the trip of the vehicle is established when the vehicle is mobilized and ends when the vehicle is demobilized.

14. A method as set forth in claim 13 wherein the mobilization of the vehicle is an on position of an ignition of the vehicle and the demobilization of the vehicle is an off position of the ignition of the vehicle.

15. A method as set forth in claim 13 wherein the mobilization of the vehicle is an initial movement of the vehicle and the demobilization of the vehicle is a cease of the movement of the vehicle for a predetermined period of time.

16. A method as set forth in claim 1 further comprising:
wherein the auxiliary mode of the vehicle is a fastening of a seat belt associated with the occupant of the vehicle; and
wherein the step of monitoring the precursory auxiliary mode event includes monitoring for a pull of the seat belt by the occupant using a seat belt sensor.

17. A method as set forth in claim 1 further comprising:
wherein the step of monitoring the precursory auxiliary mode event includes monitoring for a pressure applied to a pressure sensor disposed on a steering wheel of the vehicle.

18. A method as set forth in claim 1 further comprising:
wherein the operational input is an operational input of force to an accelerator pedal of the vehicle; and
wherein the step of monitoring the precursory auxiliary mode event includes monitoring for a removal of the operational input of force to the accelerator pedal.

19. A method as set forth in claim 18 further comprising:
monitoring for a reapplication of the operational input of force to the accelerator pedal of the vehicle;
sensing for a continued absence of the auxiliary mode; and
re-actuating the resistive device in response to the reapplication of the operational input of force and the continued absence of the auxiliary mode.

20. A method as set forth in claim 1 further comprising:
wherein the step of monitoring the first vehicle operation mode includes monitoring a mobilization period of time of the vehicle; and
wherein the step of comparing the first vehicle operation mode includes comparing the mobilization period of time to a predetermined first mobilization threshold to determine the first incident.

21. A method as set forth in claim 1 further comprising;
wherein the step of monitoring the first vehicle operation mode includes monitoring a distance traveled by the vehicle since mobilization; and
wherein the step of comparing the first vehicle operation mode includes comparing the distance traveled by the vehicle since mobilization to a predetermined first distance threshold to determine the first incident.

22. A method as set forth in claim 1 further comprising:
wherein the step of monitoring the first vehicle operation mode includes monitoring the speed of the vehicle with a first sensor; and
wherein the step of comparing the first vehicle operation mode includes comparing the vehicle speed to a predetermined first speed threshold to determine the first incident.

23. A method as set forth in claim 1 wherein the auxiliary mode of the vehicle is a fastening of a seat belt associated with the occupant of the vehicle.

24. A method as set forth in claim 1 wherein the operational input is an operational input of force to an accelerator pedal of the vehicle.

25. A method as set forth in claim 1 wherein the vehicle is an autonomous vehicle and the operational input is a manual driving mode of the autonomous vehicle and wherein the step of actuating the resistive device includes shifting the autonomous vehicle from an autonomous driving mode to the manual driving mode in response to the absence of the auxiliary mode and the first incident.

* * * * *

UNITED STATES PATENT AND TRADEMARK OFFICE
CERTIFICATE OF CORRECTION

PATENT NO. : 8,948,993 B2  
APPLICATION NO. : 14/200112  
DATED : February 3, 2015  
INVENTOR(S) : Richard Schulman and Ronald Van Houten It is certified that error appears in the above-identified patent and that said Letters Patent is hereby corrected as shown below:

In the Specification  
Column 1, line 29, should read "proceeds by monitoring"

In the Claims  
Column 11, line 54, claim 1, please change "node" to "mode"  
Column 12, line 51, claim 6, please change "slier" to "after"  
Column 13, line 12, claim 8, please change "from" to "front"  
Column 13, line 16, claim 8, please change "from" to "front"  
Column 13, line 18, claim 8, please change "from" to "front"  
Column 13, line 23, claim 8, please change "sate" to "safe"

Signed and Sealed this  
Eleventh Day of August, 2015

Michelle K. Lee  
*Director of the United States Patent and Trademark Office*